United States Patent [19]
Ostromoukhov

[11] Patent Number: 5,923,774
[45] Date of Patent: Jul. 13, 1999

[54] MATRIX-BASED GRAY COMPONENT REPLACEMENT FOR COLOR HALFTONING

[75] Inventor: Victor Ostromoukhov, Lausanne, Switzerland

[73] Assignee: Canon Information Systems, Inc., Irvine, Calif.

[21] Appl. No.: 08/646,772

[22] Filed: May 8, 1996

[51] Int. Cl.$^6$ .................................................. G06K 9/00
[52] U.S. Cl. .......................... 382/162; 358/534; 358/535
[58] Field of Search ................... 382/162, 166, 382/167, 237; 358/534, 535, 536, 456, 457, 455

[56] References Cited

U.S. PATENT DOCUMENTS

| | | | |
|---|---|---|---|
| 4,595,948 | 6/1986 | Itoh et al. | 358/75 |
| 5,331,438 | 7/1994 | Harrington | 358/500 |
| 5,355,440 | 10/1994 | Sayanagi et al. | 395/109 |
| 5,402,253 | 3/1995 | Seki | 358/518 |
| 5,422,742 | 6/1995 | Ostromoukhov | 358/457 |
| 5,438,431 | 8/1995 | Ostromoukhov | 358/457 |
| 5,477,317 | 12/1995 | Edmunds et al. | 355/326 |
| 5,497,180 | 3/1996 | Kawakami et al. | 347/131 |
| 5,633,990 | 5/1997 | Housel | 358/534 |

FOREIGN PATENT DOCUMENTS

| | | |
|---|---|---|
| 606781 | 12/1993 | European Pat. Off. . |
| 62-149259 | 7/1987 | Japan . |
| 62-220072 | 9/1987 | Japan . |
| 95/27365 | 10/1995 | WIPO . |

OTHER PUBLICATIONS

P. Emmel, et al., "A Grid–Based Method For Predicting The Behaviour Of Colour Printers", Proceedings of the Third IS&T/SID Color Imaging Conference, 1995, pp. 71–77.

V. Ostromoukhov, et al., "Artistic Screening", Computer Graphics Proceedings, SIGGRAPH '95, pp. 219–228.

I. Amidror, et al., "Spectral Analysis and Minimization of Moire Patterns In Color Separation", Journal of Electronic Imaging, vol. 3, No. 3, Jul. 1994, pp. 295–317.

V. Ostromoukhov, et al., "Two Approaches in Scanner–Printer Calibration: Colorimetric Space–Based vs. 'Closed–Loop'", Proceedings of the SPIE –The International Society of Optical Engineering, vol. 2170, 1994, pp. 133–142.

V. Ostromoukhov, et al., "Rotated Dispersed Dither: A New Technique for Digital Halftoning", Proceedings of the 21st International SIGGRAPH Conference, Jul. 1994, pp. 123–130.

V. Ostromoukhov, "Hermite Approximation For Offset Curve Computation", IFIP Transactions B (Applications in Technology), vol. B–9, 1993, pp. 189–196.

V. Ostromoukhov, "Reproduction Couleur Par Trames Irregulieres Et Semi–Regulieres", 1995.

Primary Examiner—Phuoc Tran
Attorney, Agent, or Firm—Fitzpatrick, Cella, Harper & Scinto

[57] ABSTRACT

A gray component replacement method for each pixel of a continuous tone image, first obtains intermediate halftone colorant values by applying any suitable halftoning technique to continuous tone colorant values. Halftone output values at each pixel, including a black output value, are determined based on the intermediate halftone values. If desired, halftone output values can be determined based on both the intermediate halftone values and the continuous tone colorant values.

36 Claims, 14 Drawing Sheets

COLOR MANAGEMENT SYSTEM

| 168 | 104 | 152 | 88 | 164 | 100 | 148 | 84 |
|-----|-----|-----|-----|-----|-----|-----|-----|
| 40 | 232 | 24 | 216 | 36 | 228 | 20 | 212 |
| 136 | 72 | 184 | 120 | 132 | 68 | 180 | 116 |
| 8 | 200 | 56 | 248 | 4 | 196 | 52 | 244 |
| 160 | 96 | 144 | 80 | 172 | 108 | 156 | 92 |
| 32 | 224 | 16 | 208 | 44 | 236 | 28 | 220 |
| 128 | 64 | 176 | 112 | 140 | 76 | 188 | 124 |
| 0 | 192 | 48 | 240 | 12 | 204 | 60 | 252 |

0 (BLACK)      255 (WHITE)

(HISTOGRAM)

(HISTOGRAM)

0 (BLACK)      255 (WHITE)

(HISTOGRAM)

MATRIX-BASED GRAY COMPONENT REPLACEMENT FOR COLOR HALFTONING

BACKGROUND OF THE INVENTION

1. Field of the Invention

The present invention concerns improved gray component replacement techniques for color halftone processing.

2. Description of the Related Art

Gray component replacement techniques (or undercolor removal techniques) in use in today's digital halftoning processes are inherited from traditional photolithographic gray component replacement techniques. Specifically, the gray component replacement step is generally performed as an independent step on continuous tone image values at the color separation stage, before sending the separated color planes toward a print driver. This conventional technique is illustrated in more detail in FIG. 1.

Thus, FIG. 1 shows a conventional digital halftoning process in which a continuous tone RGB image (that is, an image having continuous tone red, green and blue image values) is rendered into a halftone image for printout using CMYK (that is, cyan, magenta, yellow and black) color components. The continuous tone RGB values are received and converted to continuous tone CMY values. Gray component replacement then proceeds in which a continuous tone K value is assigned to the minimum of the CMY continuous tone values, multiplied by some percentage n. The value of n specifies the degree of gray component replacement, with typical values being 60 or 70%; 100% signifies complete undercolor removal. The CMY continuous tone values are then adjusted by subtracting out the continuous tone K value. Thereafter, the continuous tone CMYK values are converted to halftone $C_{OUT}$, $M_{OUT}$, $Y_{OUT}$ and $K_{OUT}$ values. Since the digital halftoning process contemplated herein applies to binary printout devices, such as color laser beam printers or color bubble jet printers which either print or do not print a color dot at each pixel, each of the $C_{OUT}$, $M_{OUT}$, $Y_{OUT}$ and $K_{OUT}$ values is represented by only a single bit. CMYK color component values are then printed at each pixel in accordance with the $C_{OUT}$, $M_{OUT}$, $Y_{OUT}$ and $K_{OUT}$ values for each such pixel.

The FIG. 1 approach in which gray component replacement is based on continuous tone values works well for continuous tone printers (i.e., printers that can apply continuously variable amounts of colorant to each pixel). The FIG. 1 approach also works well in traditional offset printing-based separation systems, where precise positioning of each printed color layer cannot be ensured but where it is justifiable to ignore relative phase shift between color layers since such shifts do not introduce any significant color shifts. However, the FIG. 1 approach is ill-suited for binary-type printers such as color bubble jet printers which either print or do not print a color dot at each pixel, and which print each pixel with great positional accuracy. This is because halftoning is performed after gray component replacement, resulting in a situation in which it is not possible to predict exactly where a black pixel will be printed with respect to the CMY pixels that it is supposed to replace. Since each pixel is printed with great positional accuracy, this situation can result in "holes" in the printed image, the holes being formed when CMY colorant dots for a pixel have been replaced by a black colorant dot, but the black colorant dot is printed at an adjacent pixel and not at the pixel where the CMY colorants have been replaced.

There thus exists a need for improved gray color replacement techniques for use in digital halftoning.

SUMMARY OF THE INVENTION

The present invention addresses the foregoing need by providing improved gray component replacement techniques for use in digital color halftoning.

Generally speaking, the invention improves gray component replacement by performing gray component replacement after halftone-processing the continuous tone color image values, and rather than before. Thus, continuous tone color image values are halftone-processed so as to obtain intermediate halftone values, and it is the intermediate halftone values that form the basis for gray component replacement. Preferably, gray component replacement is also based on the continuous-tone color image values, so that gray component replacement according to the invention is preferably based on both halftone-processed colorant values as well as continuous-tone colorant values.

Thus, in one aspect, the invention is an improved gray component replacement technique in which continuous tone values for each pixel of an input image are halftone-processed so as to obtain intermediate halftone values for each color. Gray component replacement is then performed on the intermediate halftone values so as to obtain output halftone values which include binary values for each colorant plus black. Preferably, gray component replacement proceeds in two steps: one step in which black is added, and another step in which colorant is subtracted. The add and subtract steps can be performed in either order and are preferably performed based on comparisons of continuous tone values with thresholds. Preferably, the thresholds are stored in dither matrices, and values for the dither matrices may differ between values used in the add black step and values used in the subtract color step.

Because the gray component replacement technique of the present invention performs gray component replacement after halftoning and based on intermediate halftone values, gray component replacement according to the invention has significant advantages over conventional techniques. Specifically, gray component replacement according to the invention improves colorfulness of the produced image since it takes into account the exact positions of color output dots in each pixel. The invention furthermore avoids undesirable fading effects inherent in traditional gray component replacement techniques, wherein substituted black components may be placed on top of a color component thus discoloring the color components. This harmful effect may be avoided with the inventive technique herein, because the exact positions of the colorant dots for each pixel are considered. Processing speed is additionally improved, since only three color layers are processed instead of the four layers used in traditional gray component replacement techniques. Printing quality is also improved, since black colorant is not added independently, but rather is added in dependence upon the intermediate halftone result of the remaining colorants. Consequently, and particularly in situations where the dither-matrix-based aspects of the invention are used, interferences such as moire or worm-like structures are not produced. The inventive technique also avoids the production of "holes" since black droplets replace color droplets at their exact positions; and for the same reasons, small detail is retained since blur effects are not introduced.

It should be understood that in the digital world of computers where only discrete values (as opposed to completely variable values) exist, it is possible only to approximate the true continuous tone images of the analog world. Thus, in the analog world, continuous tone images have completely variable values, such as the completely variable intensity of each pixel on a television's analog screen, or the completely variable tone of an ordinary black-and-white photograph. On the other hand, in the digital world of computers, it is possible only to approximate those continuously variable values, and such an approximation is done by selecting a closest one of may discrete digital values. Accordingly, as used in this specification, "continuous tone" also refers to a large set of discrete digital values, such as 256 digital values which can be represented by eight digital bits for each pixel in an image. This is sometimes referred to as "24-bit color" or "16 million color", since each of three CMY (or, RGB) colors is represented by eight digital bits.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 2:
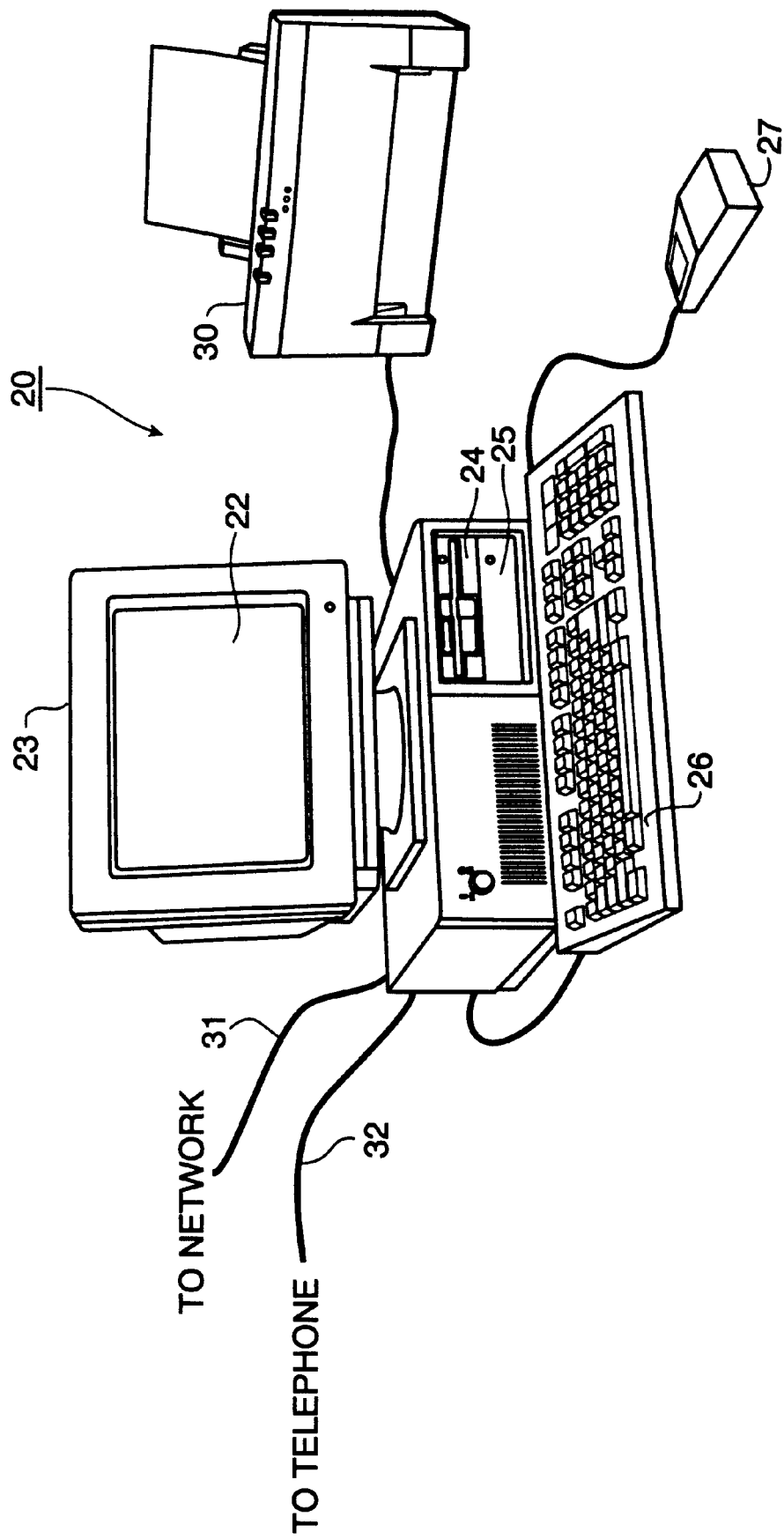
FIG. 2 is a view showing the outward appearance of representative computing equipment which incorporates gray component replacement according to the invention.

FIG. 2 is a view showing the outward appearance of representative computing equipment which incorporates matrix-based gray component replacement according to the invention. Shown in FIG. 2 is computing equipment 20 such as an IBM PC or PC-compatible computer having a windowing operating system such as a Microsoft Windows operating system. Computing equipment 20 is provided with a display monitor 23 having a display screen 22 on which computing equipment 20 displays images to the user. Computing equipment 20 is further provided with a floppy disk drive 24 with which removable floppy disk media may be read or written, fixed disk drive 25 for storing data files and application program files, a keyboard 26 for permitting input of text data and manipulation of objects displayed on display screen 22, and a pointing device 27 such as a mouse or the like which is also provided to permit manipulation of objects on display screen 22. A conventional color printer 30, such as a color bubble jet printer, is also provided. Also provided are connections to a network 31 or to an ordinary voice telephone line 32, both for sending and receiving color image data as well as other files such as files which include program instruction sequences by which computing equipment 20 is operated.

While a bubble jet printer is presently preferred, any color printer which forms full color images by outputting colorants in amounts set by corresponding color component values, such as a color laser beam printer or color thermal wax printer or the like, is suitable in the practice of the invention.

In accordance with operator instructions, and under control of the windowing operating system, stored application programs such as graphics application programs, drawing application programs, desktop publishing application programs and the like, are selectively activated to process and to manipulate data. Also in accordance with operator instructions, and based on those stored application programs, commands are issued to display images on monitor 23 and to print images appearing on monitor 23, and those images are then printed on printer 30 as described more fully hereinbelow.

Figure 3:
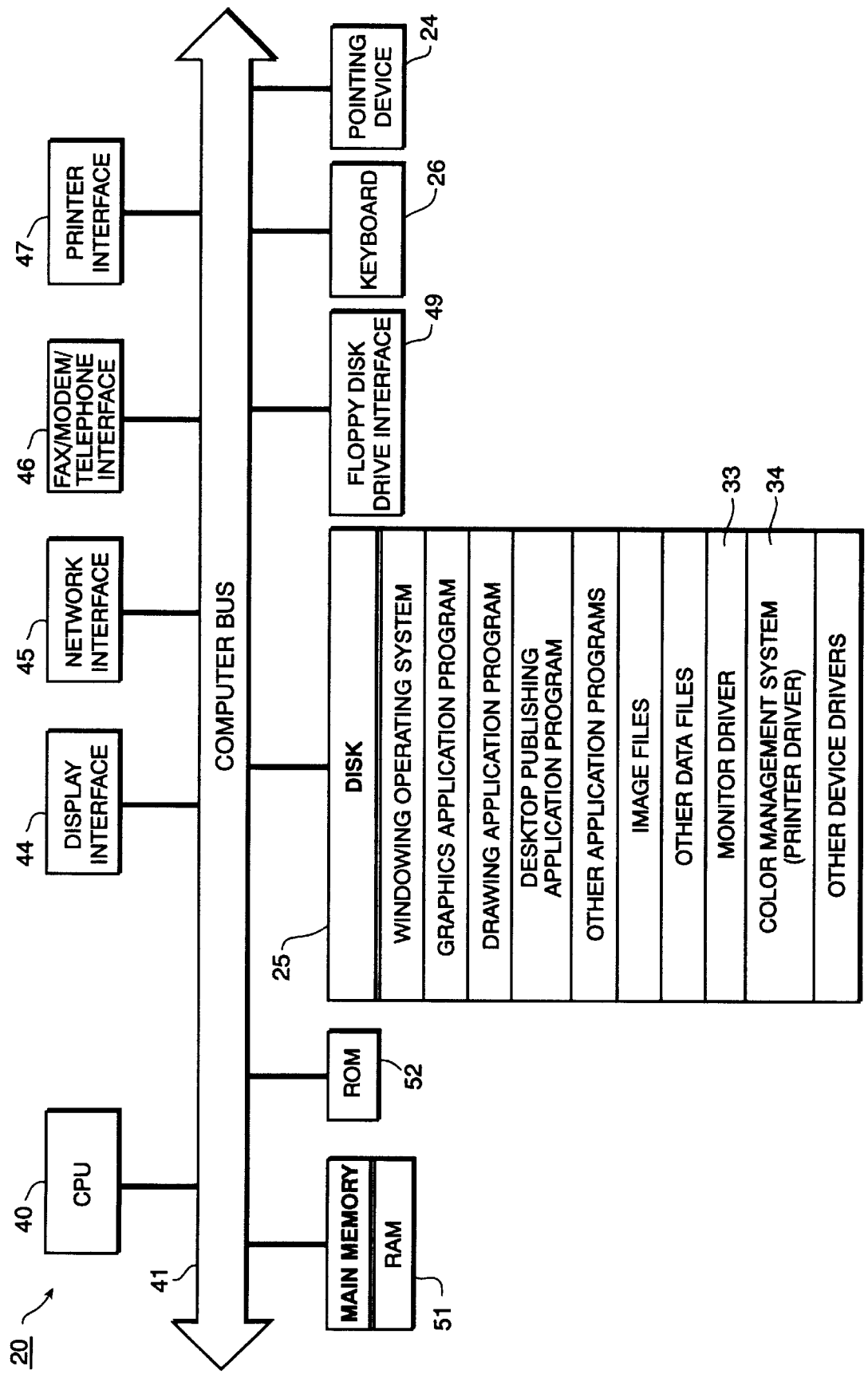
FIG. 3 is a detailed block diagram showing the internal construction of FIG. 2.

FIG. 3 is a detailed block diagram showing the internal construction of computing equipment 20. As shown in FIG. 3, computing equipment 20 includes a central processing unit (CPU) 40 such as programmable microprocessor interfaced to a computer bus 41. Also interfaced to computer bus 41 is display interface 44, network interface 45 for interfacing to network 31, fax/modem/telephone interface 46 for interfacing to telephone 32, printer interface 47, and floppy disk drive interface 49.

Main memory 51 such as random access memory (RAM) interfaces to computer bus 41 so as to provide CPU 40 with access to memory storage. In particular, when executing stored application program instruction sequences such as those associated with application programs stored on disk 25, CPU 40 loads those instruction sequences from disk 25 (or other storage media such as media accessed via network 31 or floppy disk drive 24) into main memory 51 and executes those stored program instruction sequences out of main memory 51.

ROM (read only memory) 52 is provided for storing invariant instruction sequences such as start-up instruction sequences or basic input/output operating system (BIOS) sequences for operation of keyboard 26.

As shown in FIG. 3, and as previously mentioned, fixed disk 25 stores program instruction sequences for the windowing operating system and for various application programs such as a graphics application program, a drawing application program, a desktop publishing application program, and the like. In addition, stored on fixed disk 25 are color image files such as are displayed on monitor 23 or printed on printer 30 under control of a designated application program. Fixed disk 25 also stores a monitor driver 33 which controls how RGB color primary values are provided to display interface 44, and color management system 34 which is a printer driver for controlling how CMYK color component values are provided to printer interface 47 for printout by printer 30. Matrix-based gray component replacement according to the invention, in this embodiment of the invention, resides in color management system 34. Other device drivers are also stored on fixed disk 25, for providing appropriate signals to the various devices (such as the network) connected in computing equipment 20.

Ordinarily, application programs and drivers stored on disk 25 need first to be installed by the user onto disk 25 from other computer readable media on which those programs and drivers are initially stored. For example, it is customary for a user to purchase a floppy disk or other computer readable media on which a copy of color management system 34 is stored. The user would then install color management system 34 onto disk 25 by inserting the purchased floppy disk into floppy disk drive 24 and by commanding CPU 40 to copy color management system 34 from the floppy disk onto disk 25. It is also possible for the user, via telephone 32 and modem interface 46, or via network 31 and network interface 45, to download color management system 34 from a computerized bulletin board to which the drivers had previously been uploaded.

Figure 4:
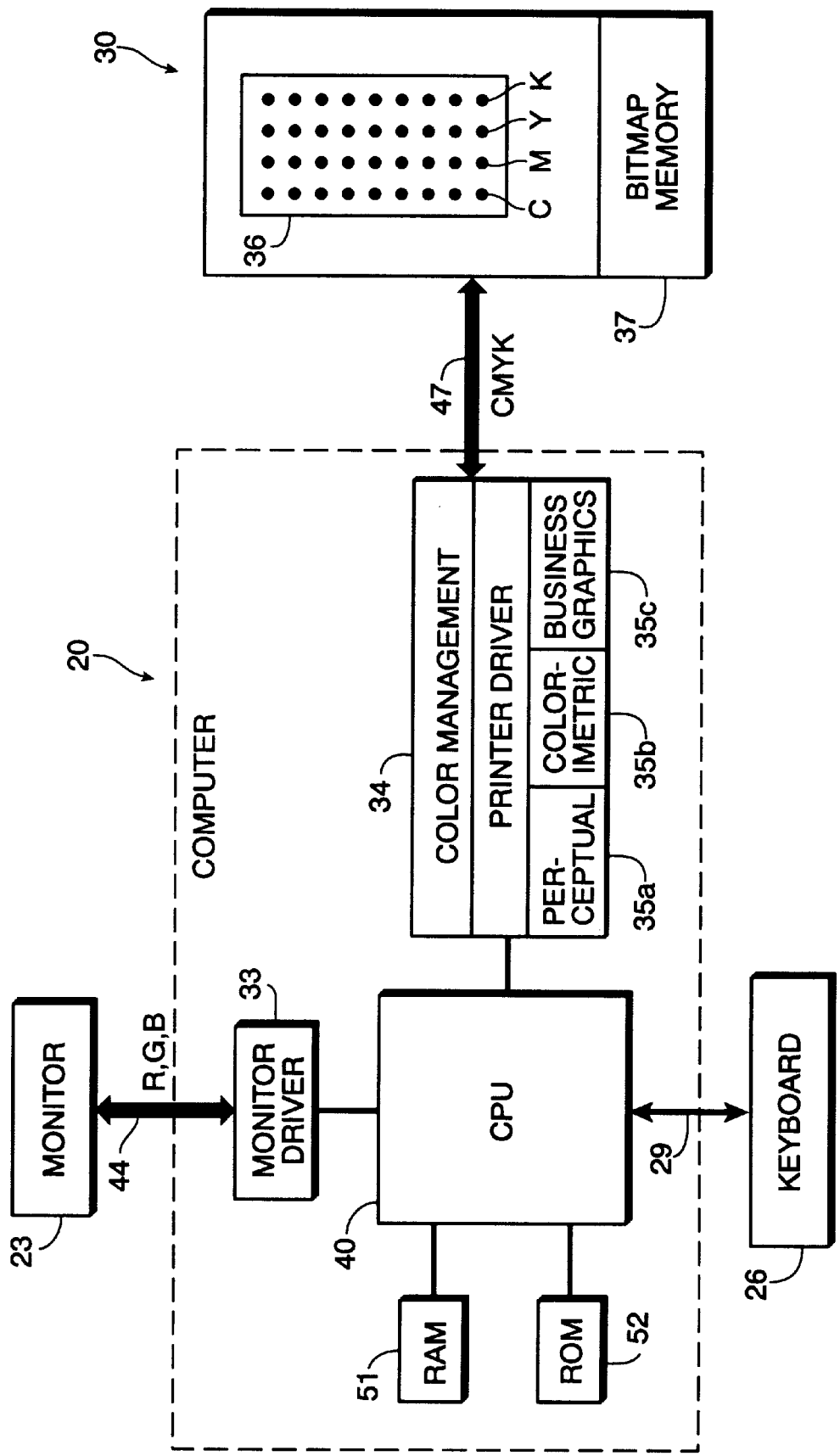
FIG. 4 is a functional block diagram which stresses functional connectivity of some of the elements of the FIG. 3 block diagram.

FIG. 4 is a functional block diagram showing how computer 20 interacts with monitor 23 and printer 30. Shown in FIG. 4 are computer 20 with monitor driver 33, color management system 34, CPU 40, RAM 51 and ROM 52, all arranged functionally rather than structurally, as in FIG. 3.

As mentioned above, using keyboard 26, an operator can cause CPU 40 to execute stored program instructions which cause color images to be displayed on monitor 23 and which cause corresponding color images to be printed on color printer 30. Specifically, and in cooperation with the stored program instructions in the application program stored on disk 25, CPU 40 derives a color image for display on monitor 23. CPU provides the color image to monitor driver 33 which in turn derives RGB values for each pixel in the monitor 23. The RGB values are provided via display interface 44 to monitor 23 where those values are displayed. Since monitor 23 is a continuous tone analog device, the color image displayed on monitor 23 from the derived RGB values is a continuous tone image.

Upon request, CPU 40 also feeds a color image to color management system 34 for printing by color printer 30. Color management system 34 derives CMYK values for each pixel of the color image based on the RGB color values provided from CPU 40. The color management system 34 allows selection, ordinarily by the user but in some cases automatically by CPU 40, of one of plural rendering modes, here, a perceptual rendering mode, a calorimetric rendering mode, and a business graphics rendering mode. Matrix-based gray component replacement according to the invention, in this embodiment of the invention, operates during the perceptual rendering mode, but it is possible to incorporate gray component replacement according to the invention in any or all of the rendering modes. Whichever one of the plural modes is selected, however, the ultimate purpose of color management system 34 is to obtain halftoned CMYK values which correspond to the RGB values provided from CPU 40, and to provide the halftoned CMYK values to printer 30 for printing.

More particularly, for each pixel of an image on monitor 23, color management system 34 converts the continuous tone RGB value of the pixel into a binary halftone value for each of the CMYK color components printed by printer 30. (One pixel on monitor 23 might be mapped onto a plurality of pixels for printer 30, so as to accommodate a difference in resolutions of the monitor and the printer, typically 75 dpi for a monitor and 360 or 720 dpi for a printer.) For example, if each pixel of the image on monitor 23 is represented by a 24-bit RGB value (i.e., eight bits for R, eight bits for G, and eight bits for B), color management system 34 obtains a digital halftone value in which each of the CMYK color components is represented by a single bit indicating whether a dot of the respective color component is to be printed at a corresponding pixel position by printer 30.

Thereafter, color management system 34 feeds the CMYK values via printer interface 46 to printer 30 where they are stored in bitmap memory 37 within printer 30. Bitmap memory 37 may store a full bitmap image of the printed image, or it may store only a band or partial bitmap image. When sufficient color data, namely binary halftoned CMYK data, is stored in bitmap memory 37, a color print head 36 reciprocates across a platen adjacent a sheet of paper. In a preferred embodiment, print head 36 includes 32 ink jet nozzles arranged in a four column by eight row pattern. The nozzles in the first column all eject droplets of cyan ink; the nozzles in the second column all eject droplets of magenta ink; the nozzles in the third column all eject droplets of yellow ink; and the nozzles in the fourth column all eject droplets of black ink. The nozzles are controlled independently in accordance with the color data in bitmap memory 37 such that in one reciprocation of print head 36 across the platen, eight rows of pixels are printed.

Figure 5:
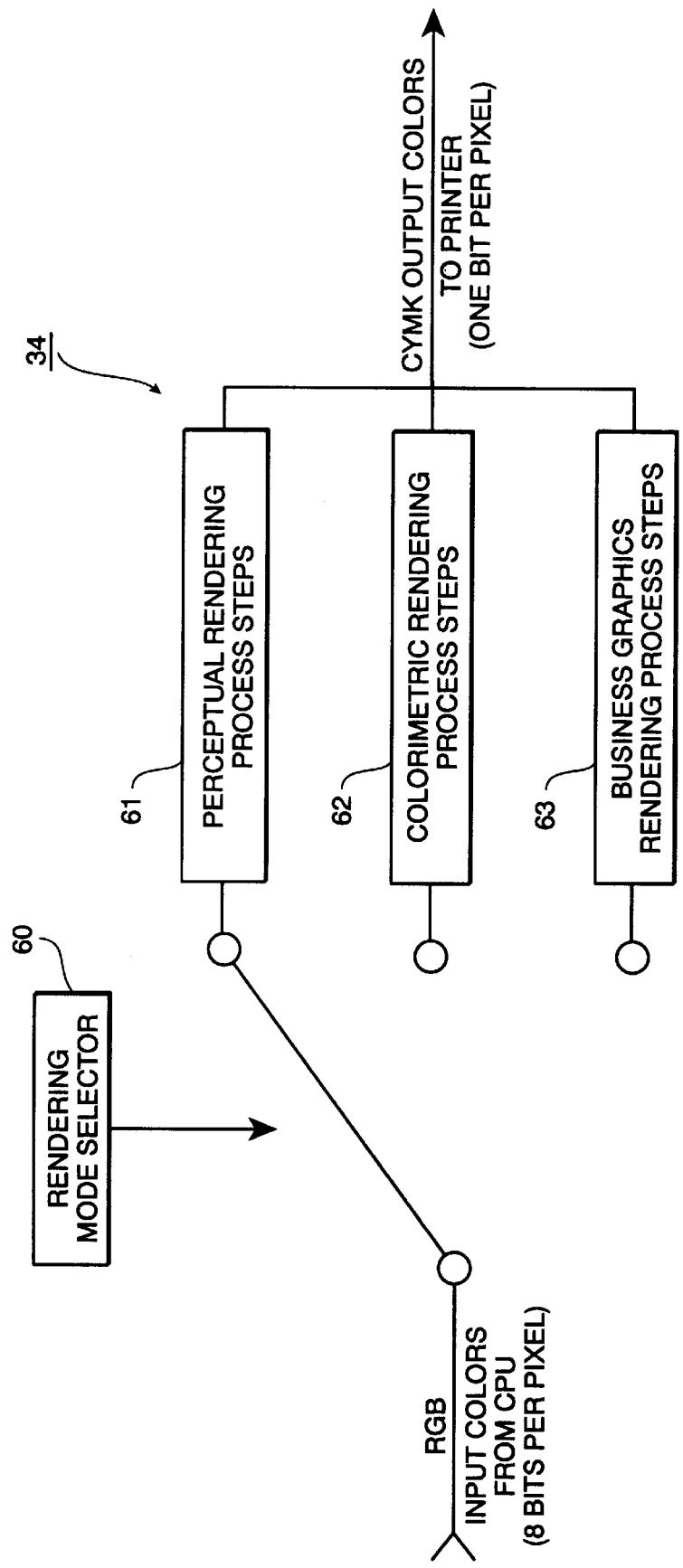
FIG. 5 is a functional view of a color management system including gray component replacement according to the invention.

FIG. 5 is a view showing the functional arrangement of color management system 34. The color management system shown in FIG. 5 includes plural different rendering modes, in which at least one rendering mode such as the perceptual rendering mode incorporates matrix-based gray component replacements according to the invention. As shown in FIG. 5, color management system 34 includes a rendering mode selector 60 which allows selection between one of the plural rendering modes of the color management system. Preferably, rendering mode selector 60 is a user manipulable graphical user interface which allows a user, after commanding an image to be printed, to select one of the plural rendering modes by which color management system 34 is able to render the image. Alternatively, it is also possible for rendering mode selector 60 to be actuatable automatically under control of CPU 40, in which case CPU 40 would make automatic selection of the proper rendering mode. Such automatic selection may, for example, be made based on the type of application software which is generating the image, based on data or image type, based on data structure, based on a histogram or other analysis of color distribution in the image, or the like. For example, all .BMP type data might have perceptual rendering automatically selected, while vector graphics might have business graphics rendering automatically selected, and so on.

Based on the mode selected by rendering mode selector 60, RGB input colors from CPU 40 are fed for appropriate processing to the selected one of the plural rendering modes, so as to generate printer CMYK colorant values.

Figure 6:
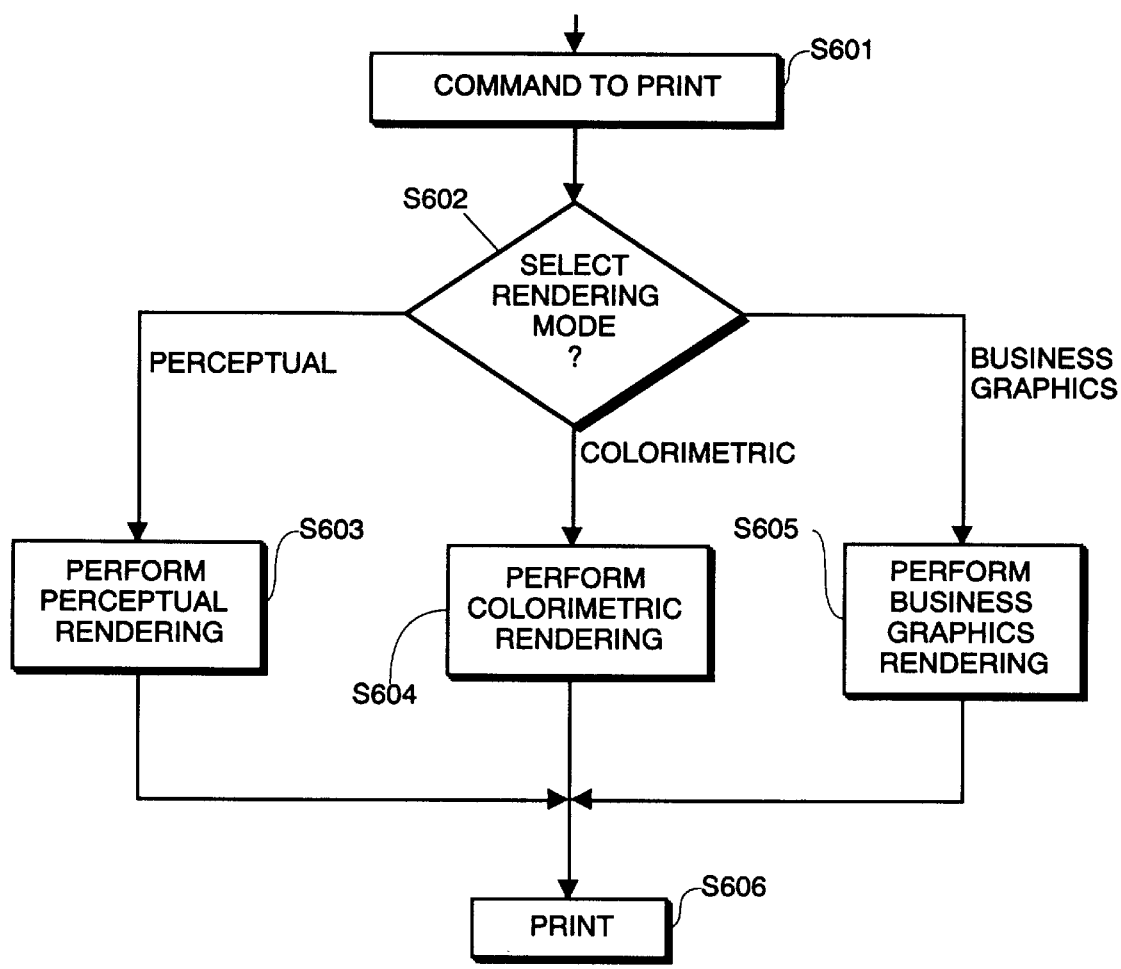
FIG. 6 is a flow diagram showing operation of the color management system of FIG. 5.

FIG. 6 is a flow diagram used for explaining operation of color management system 34 shown in FIG. 5.

In step S601, a user issues a command to print. Flow then advances to step S602 in which a rendering mode is selected. Specifically, as mentioned above in connection with FIG. 5, step S602 utilizes rendering mode selector 60 so as to select one of the plural different rendering modes included in color management system 34. Selection can be manual by the user or automatic by computer, although automatic selection with manual override is preferred.

If a perceptual rendering mode is selected in step S602, then flow advances to step S603 in which perceptual rendering is performed in accordance with perceptual rendering process steps 61. Perceptual rendering in accordance with step S603, which includes matrix-based gray component replacement according to the invention, is described in further detail in connection with FIGS. 7, 8 and 9. Thereafter, digital halftoned CMYK values derived in perceptual rendering step S603 are provided to printer 30 for printing (step S606).

If in step S602 colorimetric rendering is selected, then flow advances to step S604 in which colorimetric rendering is performed in accordance with colorimetric rendering process steps 62. Any suitable colorimetric rendering process steps may be used, as will be apparent to those skilled in the art. Thereafter, CMYK values derived in calorimetric rendering step S604 are provided to printer 30 for printing (step S606).

If in step S602 business graphics rendering is selected, then flow advances to step S605 in which business graphics rendering is performed in accordance with business graphics rendering process steps 63. Any suitable business graphics rendering may be used, as will be apparent to those skilled in the art. Thereafter, CMYK values derived in business graphics rendering step S605 are provided to printer 30 for printing (step S606).

Figure 7:
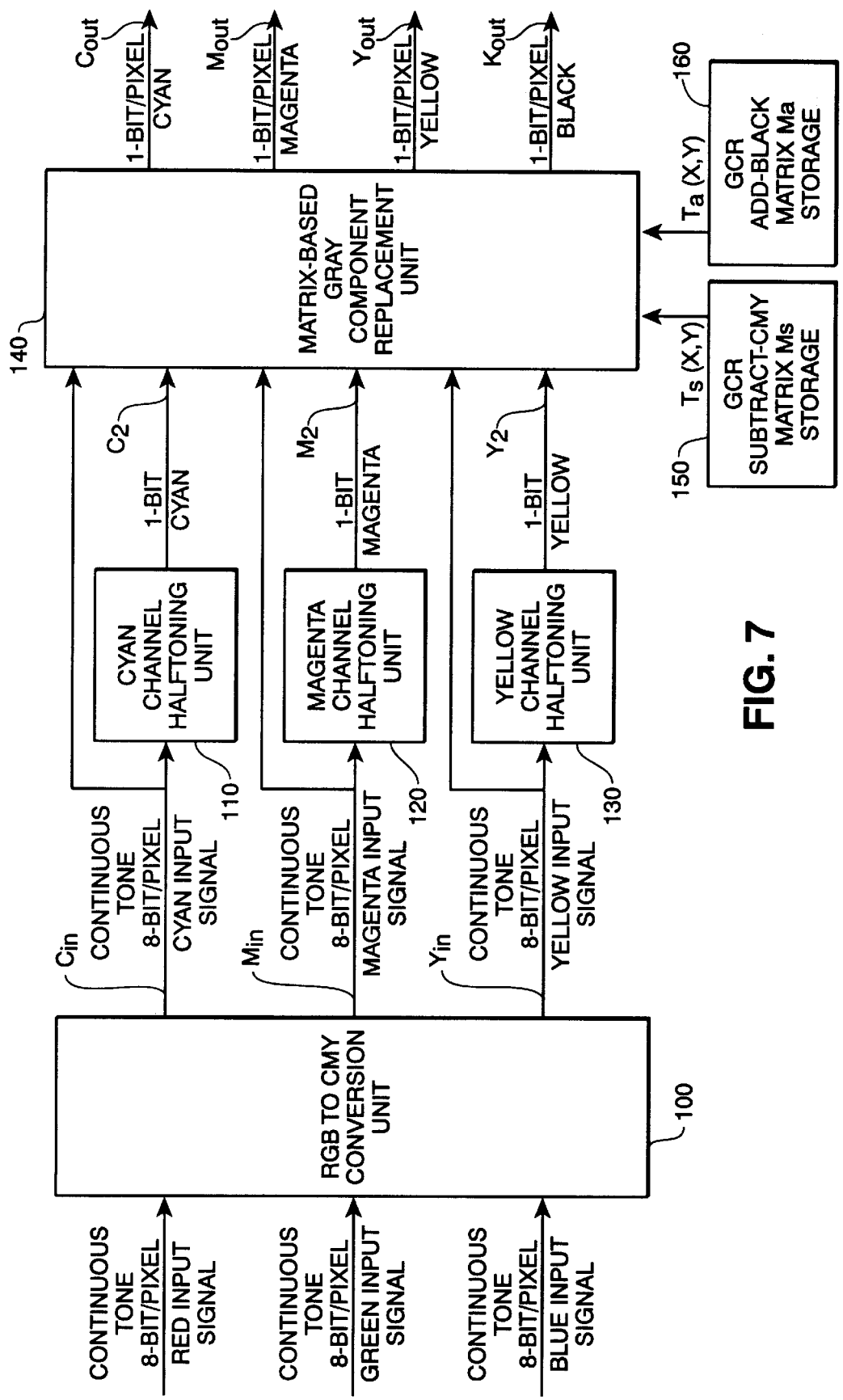
FIG. 7 is a block diagram showing gray component replacement apparatus according to the invention.

FIG. 7 is a simplified functional block diagram of perceptual rendering process steps 61. As shown in FIG. 7, perceptual rendering process steps 61 include an RGB-to-CMY conversion unit 100 for converting continuous tone RGB values to continuous tone CMY values. Conversion unit 100 preferably performs RGB to CMY conversion so as to obtain a best-possible match between RGB and CMY colors, in the perceptual sense, taking into account differences in gamut between monitor 23 and printer 30. It should be understood that if matrix-based gray component replacement is incorporated into calorimetric rendering process steps 62 or into business graphics processing steps 63, then RGB to CMY conversion in unit 100 should be best-possible conversion in the colorimetric or business graphic sense, respectively, again taking into account the differences in gamut between monitor 23 and printer 30.

Units 110, 120 and 130 are halftoning units for cyan, magenta and yellow channels, respectively. Each of halftoning units 110, 120 and 130 functions to convert a continuous tone color signal into a one bit binary halftone value, which in FIG. 7 are intermediate halftone values $C_2$, $M_2$ and $Y_2$. Any halftoning technique may be used, so long as it takes a continuous tone value such as the eight bit per pixel input value shown in FIG. 7, and outputs a binary halftone value, such as the one bit per pixel on/off output value indicated in FIG. 7. For example, an error diffusion halftoning technique may be performed as well as any other halftoning technique such as dispersed matrix ordered dithering, cluster dot ordered dithering, blue-noise masking, etc.

Matrix-based gray component replacement unit 140 accepts as its inputs both the intermediate halftone values $C_2$, $M_2$ and $Y_2$, output respectively from halftoning units 110, 120 and 130, as well as the continuous tone CMY signals from RGB-to-CMY conversion unit 100. Gray component replacement unit 140 also has access to two storage regions 150 and 160, with region 150 for storing a matrix $M_S$ of thresholds by which replacement unit 140 determines whether to subtract color, and with region 160 storing a matrix $M_A$ of thresholds by which replacement unit 140 determines whether to add black. Based on the continuous tone CMY signals, and on the intermediate halftone values $C_2$, $M_2$ and $Y_2$, and by reference to the matrices $M_S$ and $M_A$ storing thresholds to subtract color and to add black, gray component replacement unit 140 determines digital halftone values $C_{OUT}$, $M_{OUT}$, $Y_{OUT}$ and $K_{OUT}$ which are printed for each pixel by printer 30. That is, for each pixel of continuous tone RGB input, gray component replacement unit 140 determines a one bit per pixel value for each of the CMYK colorants of printer 30.

Figure 8:
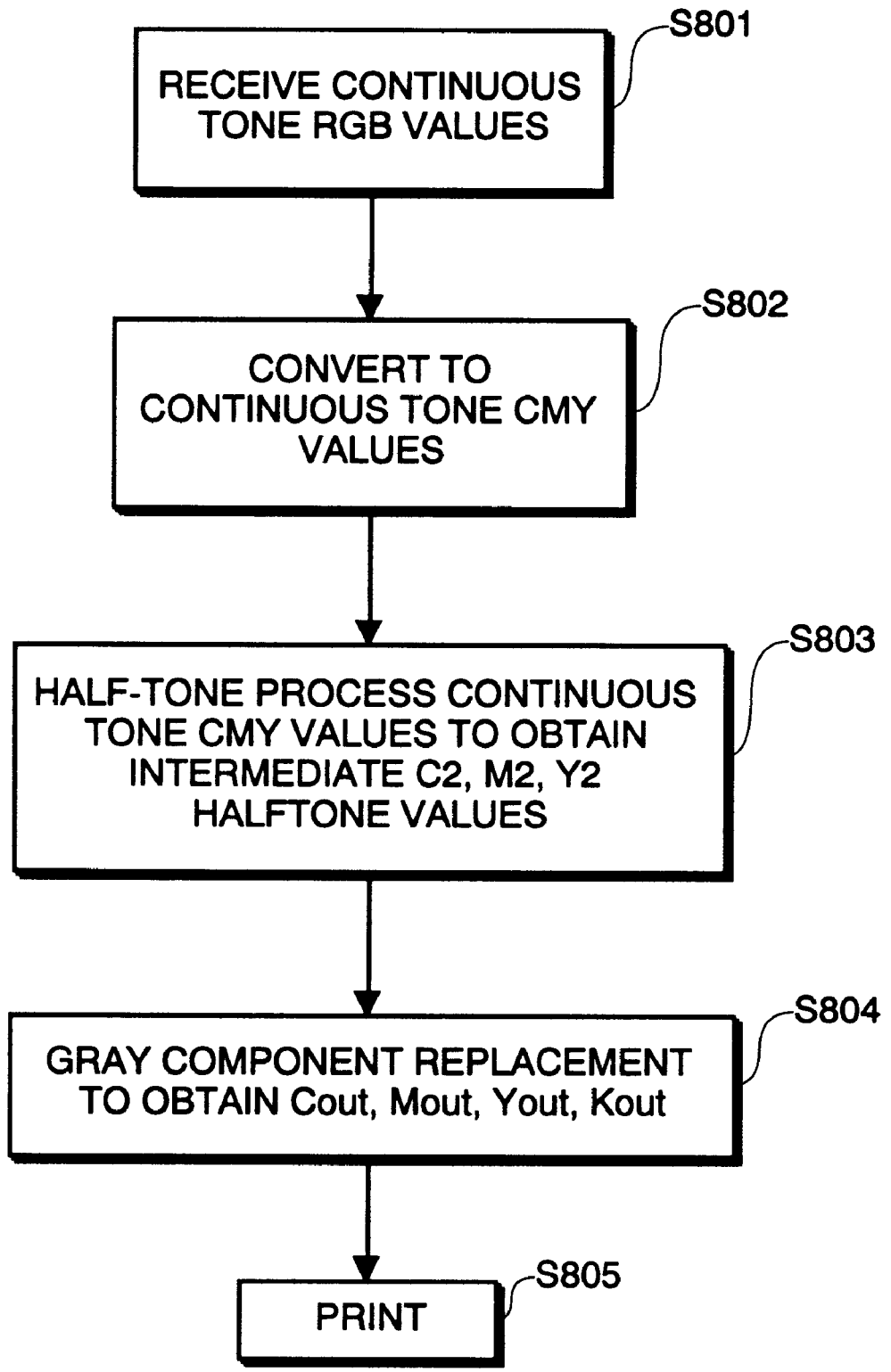
FIG. 8 is a flow diagram showing operation of gray component replacement according to the invention.

Operation of the FIG. 7 arrangement will be explained with respect to the flow diagram shown in FIG. 8, which corresponds to process steps 61 for perceptual rendering. Briefly, the process steps shown in FIG. 8 illustrate gray component replacement in which continuous tone colorant values are halftone-processed so as to obtain intermediate binary halftone values, and in which gray component replacement is performed based on the intermediate binary halftone values (and preferably also based on the continuous tone colorant values) so as to obtain binary halftone values which include a gray component.

Thus, in step S801, and for each pixel, RGB-to-CMY conversion unit 100 receives a continuous tone RGB value. The continuous tone RGB value is converted in step S802 by conversion unit 100 into continuous tone CMY values. Halftone units 110, 120 and 130 each halftone process respective continuous tone CMY values so as to obtain intermediate binary halftone values $C_2$, $M_2$ and $Y_2$, respectively (step S803). In step S804, gray component replacement unit 140 processes the intermediate $C_2$, $M_2$ and $Y_2$ binary halftone values, as well as the continuous tone CMY values output from conversion unit 100, so as to obtain binary halftone values $C_{OUT}$, $M_{OUT}$, $Y_{OUT}$ and $K_{OUT}$, which include a gray component. Thereafter, in step S804, the binary halftone values $C_{OUT}$, $M_{OUT}$, $Y_{OUT}$ and $Y_{OUT}$ are printed.

Figure 9:
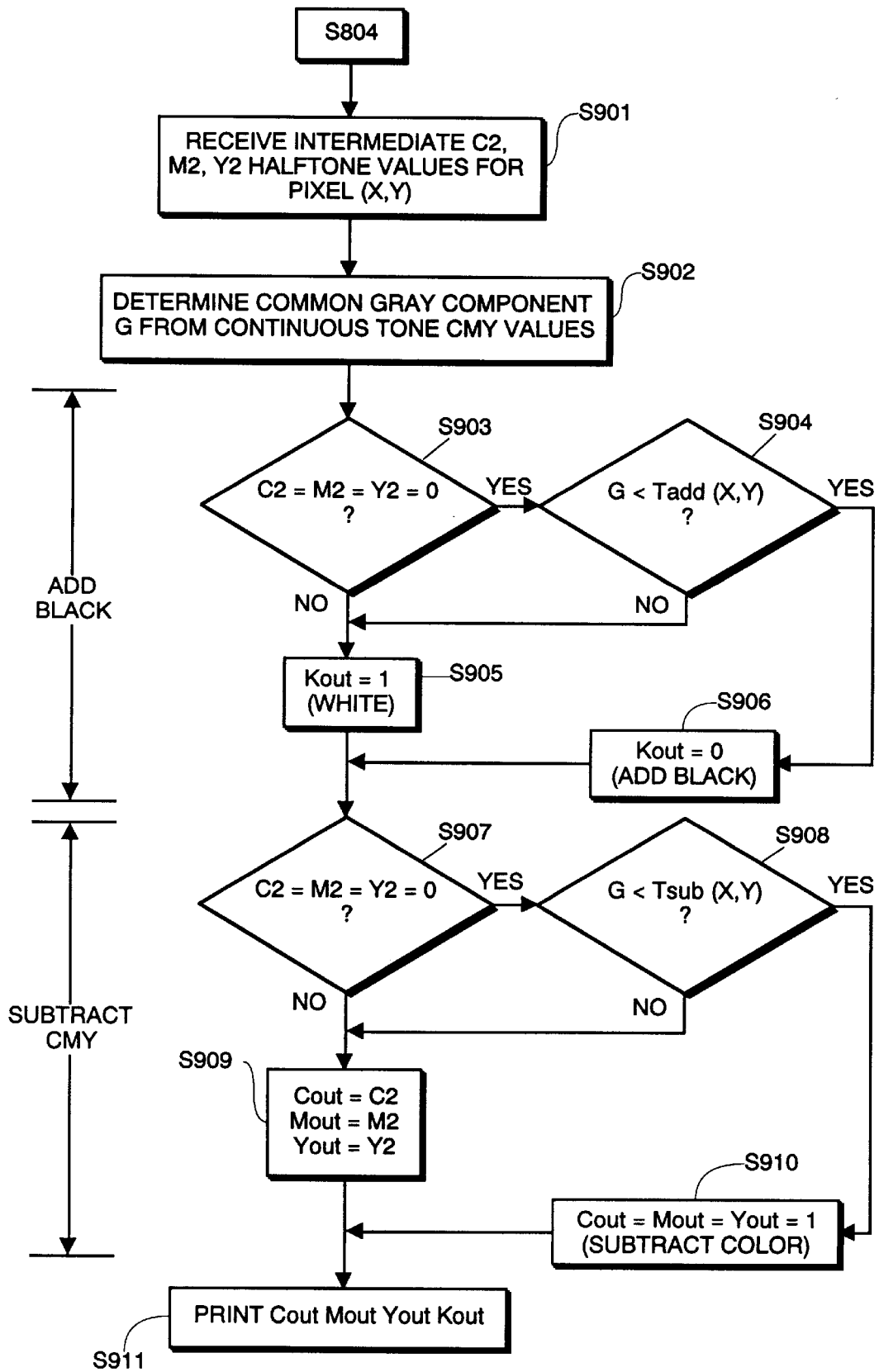
FIG. 9 is a flow diagram showing gray component replacement of FIG. 8 in greater detail.

FIG. 9 illustrates step S804 in more detail, and shows how gray component replacement unit 140 obtains binary halftone values $C_{OUT}$, $M_{OUT}$, $Y_{OUT}$ and $K_{OUT}$ based on intermediate halftone values $C_2$, $M_2$ and $Y_2$, based on continuous tone CMY values, and by reference to thresholds stored in matrices $M_S$ and $M_A$ which determine when to add black and when to subtract color.

Thus, in step S901, gray component replacement unit 140 receives intermediate $C_2$, $M_2$ and $Y_2$ halftone values for a particular pixel (x,y). In step S902, based on the continuous tone CMY values, a common gray component G is determined, as follows:

$$G = \max(C_{IN}, M_{IN}, Y_{IN})$$

Figure 1:
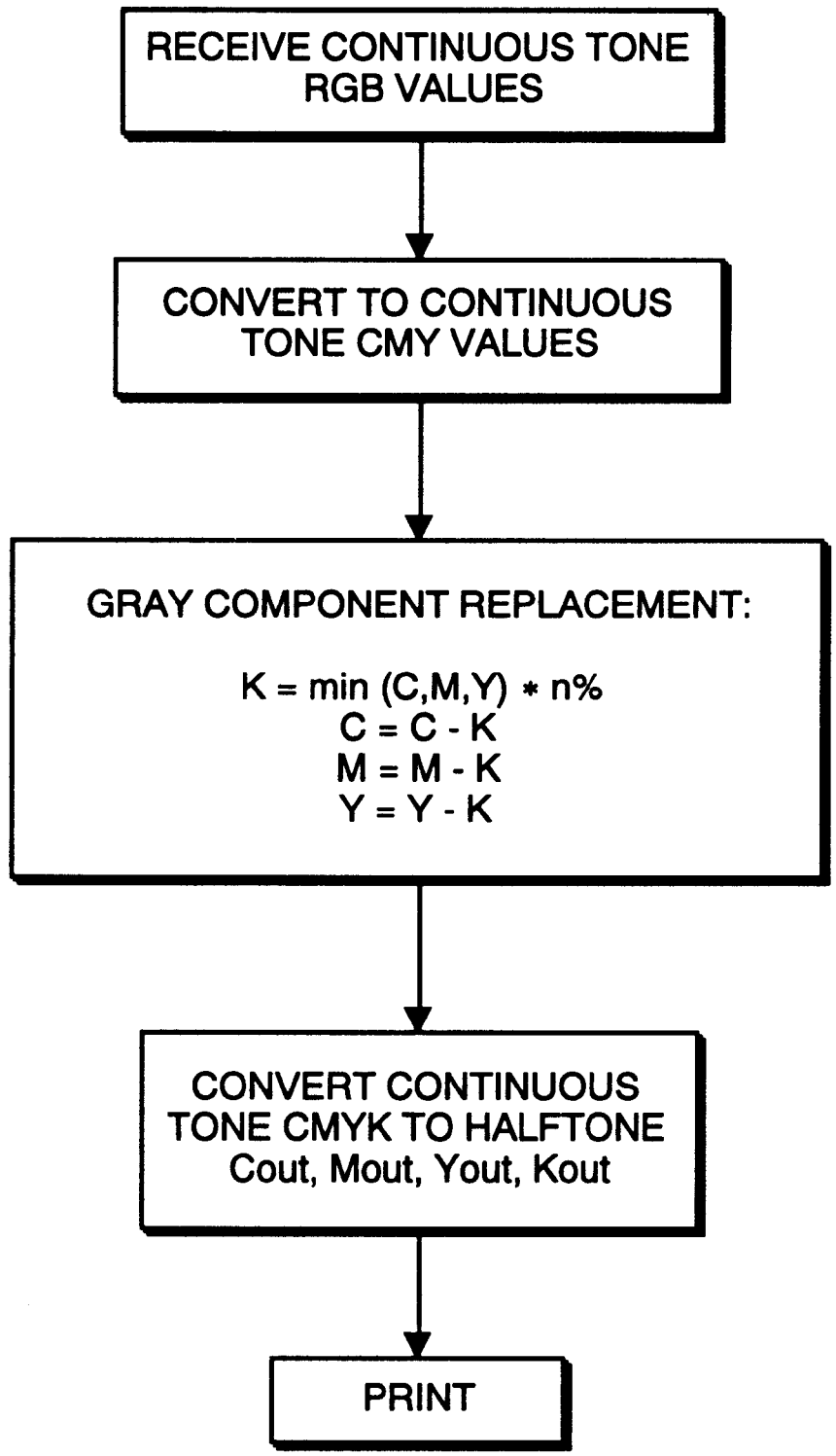
FIG. 1 is a flow diagram showing gray component replacement according to conventional digital halftoning systems.

Note that in the convention used here, (and completely opposite to the convention shown in FIG. 1), zero corresponds to black while 255 corresponds to white. Conversion to a convention in which zero corresponds to white and 255 corresponds to black is a simple matter, which can be obtained by exchanging minimums with maximums and vice-versa.

Continuing with FIG. 9, gray component replacement unit 140 processes the intermediate halftone values $C_2$, $M_2$ and $Y_2$, as well as the continuous tone CMY values, so as to obtain binary halftone outputs in a two-step process in which one step adds black and another step subtracts color. To add black, replacement unit 140 determines whether all intermediate halftone values $C_2$, $M_2$, $Y_2$ are zero (step S903), and also determines whether the common gray component G is less than a threshold $T_A(x,y)$ corresponding to pixel location (x,y) in matrix $M_A$, for adding black (step S904). If both conditions are simultaneously satisfied, then black is added in step S906 by setting $K_{OUT}$ equal to zero. On the other hand, if both conditions are not simultaneously satisfied, then black is not added by setting $K_{OUT}$ equal to one in step S905.

To subtract color, gray component replacement unit 140 determines whether all intermediate halftone values $C_2$, $M_2$ and $Y_2$ are all equal to zero (step S907), as well as whether the common gray component G is less than a threshold $T_S(x,y)$, corresponding to pixel location (x,y) in matrix $M_S$, for subtracting color (step S908). If both conditions are not simultaneously satisfied, then color is not subtracted, and $C_{OUT}$, $M_{OUT}$ and $Y_{OUT}$ are set to the intermediate halftone values determined by halftoning units 110, 120 and 130, as follows:

$$C_{OUT} = C_2$$

$$M_{OUT} = M_2$$

$$Y_{OUT} = Y_2$$

On the other hand, if both conditions in steps S907 and S908 are simultaneously satisfied, then color is subtracted by setting each of $C_{OUT}$, $M_{OUT}$ and $Y_{OUT}$ equal to one (in step S910).

Thereafter, $C_{OUT}$, $M_{OUT}$, $Y_{OUT}$ and $K_{OUT}$ are printed in step S911.

FIGS. 10, 11 and 12 provide examples of suitable threshold matrices for use in the add black step and the subtract color step. Generally speaking, if threshold values $T_S(x,y)$ and $T_A(x,y)$, respectively corresponding to subtract and add thresholds, are identical for any coordinates (x,y) (that is, the matrices $M_A$ and $M_S$ are identical), then gray component replacement unit 140 performs full gray color replacement. If the threshold values are not identical, then only partial gray component replacement is performed. Partial gray component replacement is particularly useful in situations where the printed dot size for a black pixel differs from the printed dot size for CMY colorants.

All of the matrices shown in FIGS. 10, 11 and 12 are derived based on a simple Bayer's well-dispersed square matrix $D^{2n}$ of dimensions 2n by 2n, which as those skilled in the art are aware, can be obtained iteratively from a matrix $D^n$ of a matrix n by n, as follows:

$$D^{2n} = \begin{vmatrix} 4D^n + 2*U^n & 4D^n + 1*U^n \\ 4D^n + 0*U^n & 4D^n + 3*U^n \end{vmatrix}$$

where $U^n$ is a singular matrix of size n by n:

$$U^n = \begin{vmatrix} 1 & 1 & \ldots & 1 \\ 1 & 1 & \ldots & 1 \\ \ldots & \ldots & \ldots & \ldots \\ 1 & 1 & \ldots & 1 \end{vmatrix}$$

and the first-iteration matrix $D^2$ is defined as $$D^2 = \begin{vmatrix} 2 & 1 \\ 0 & 3 \end{vmatrix}$$

Figures 10A, 10B:
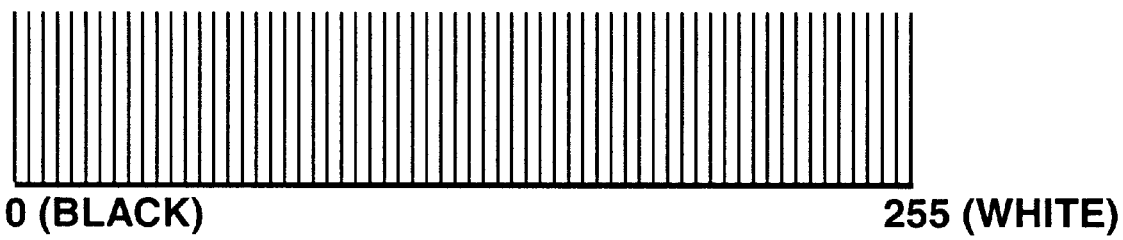
FIGS. 10(a), 11(a) and 12(a) are illustrations of threshold matrices for use in gray component replacement according to the invention.
FIGS. 10(b), 11(b) and 12(b) are histograms showing the distribution of thresholds in the matrices of FIGS. 10(a), 11(a) and 12(a), respectively.

FIG. 10(a) shows thresholds obtained by the foregoing method for an 8 by 8 threshold matrix. As shown in FIG. 10(b), the distribution of thresholds of the FIG. 10(a) matrix is uniform, in the range from white to black, in that increasingly darker common gray components G uniformly cause increasingly more pixels of the threshold matrix to be darkened.

Figures 11A, 11B:
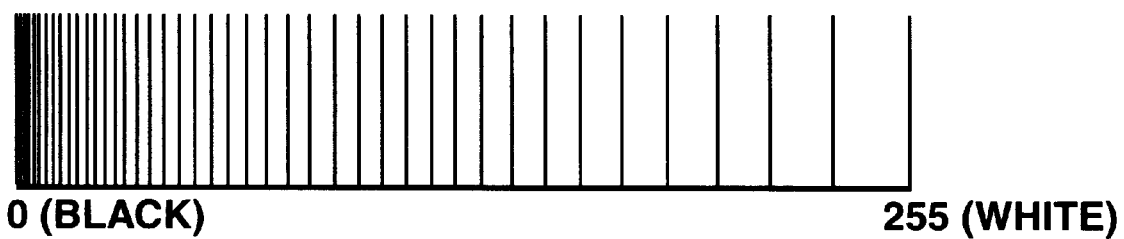
Figures 12A, 12B:
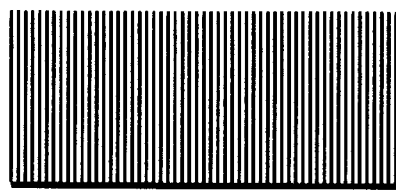

FIGS. 11(a) and 12(a) are mappings of the thresholds in FIG. 10(a) so as to effect different gray component replacement properties. Thus, as shown in FIG. 11(b), the distribution of thresholds of the FIG. 11(a) matrix is non-uniform in the range from white to black. The effect of this modification causes gray component replacement to be stronger in dark grays than with respect to light grays since little gray component replacement is performed in lighter grays and greater gray component replacement is performed in darker grays.

The thresholds in the matrix shown in FIG. 12(a) have a distribution that is uniform in the range from 50% gray to black. The effect on gray component replacement using the threshold matrix of FIG. 12(a) is that there is no gray component replacement for lighter grays (i.e., grays whiter than 50% gray), while there is a uniformly progressive gray component replacement in dark grays (i.e., grays darker than 50% gray).

The matrices shown in FIGS. 10(a), 11(a) and 12(a) are representative only, and should not be construed in a limiting sense. In particular, it is possible to set thresholds in matrices $M_A$ and $M_S$ as needed to obtain desired gray component replacement properties, or in certain circumstances the thresholds for all pixel locations (x,y) can be the same (i.e., $M_A = M_S$ = a matrix of constant values).

Figure 13:
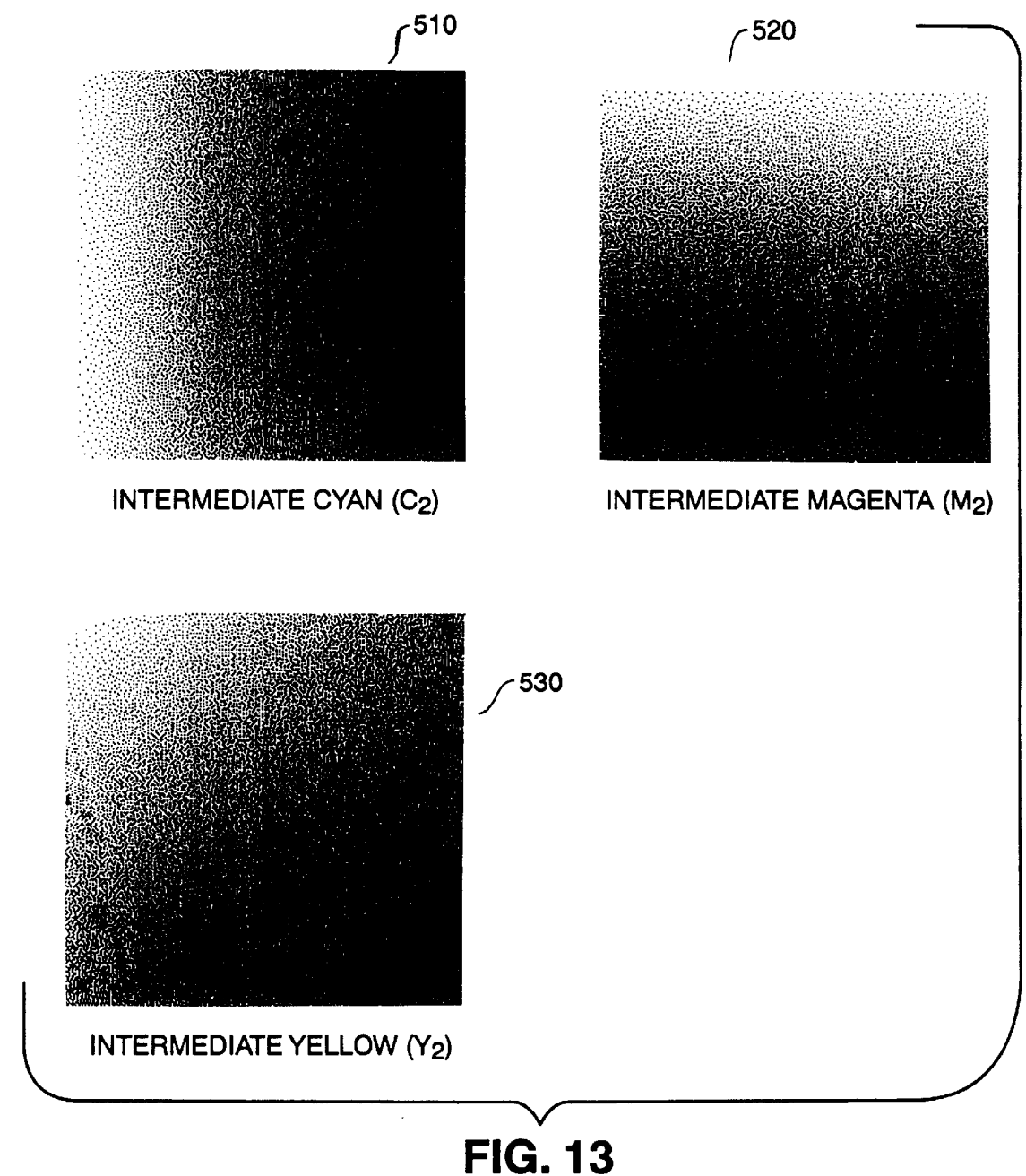
FIG. 13 shows representative intermediate halftoned values for cyan, magenta and yellow, respectively, before application of gray component replacement according to the invention.
Figure 14:
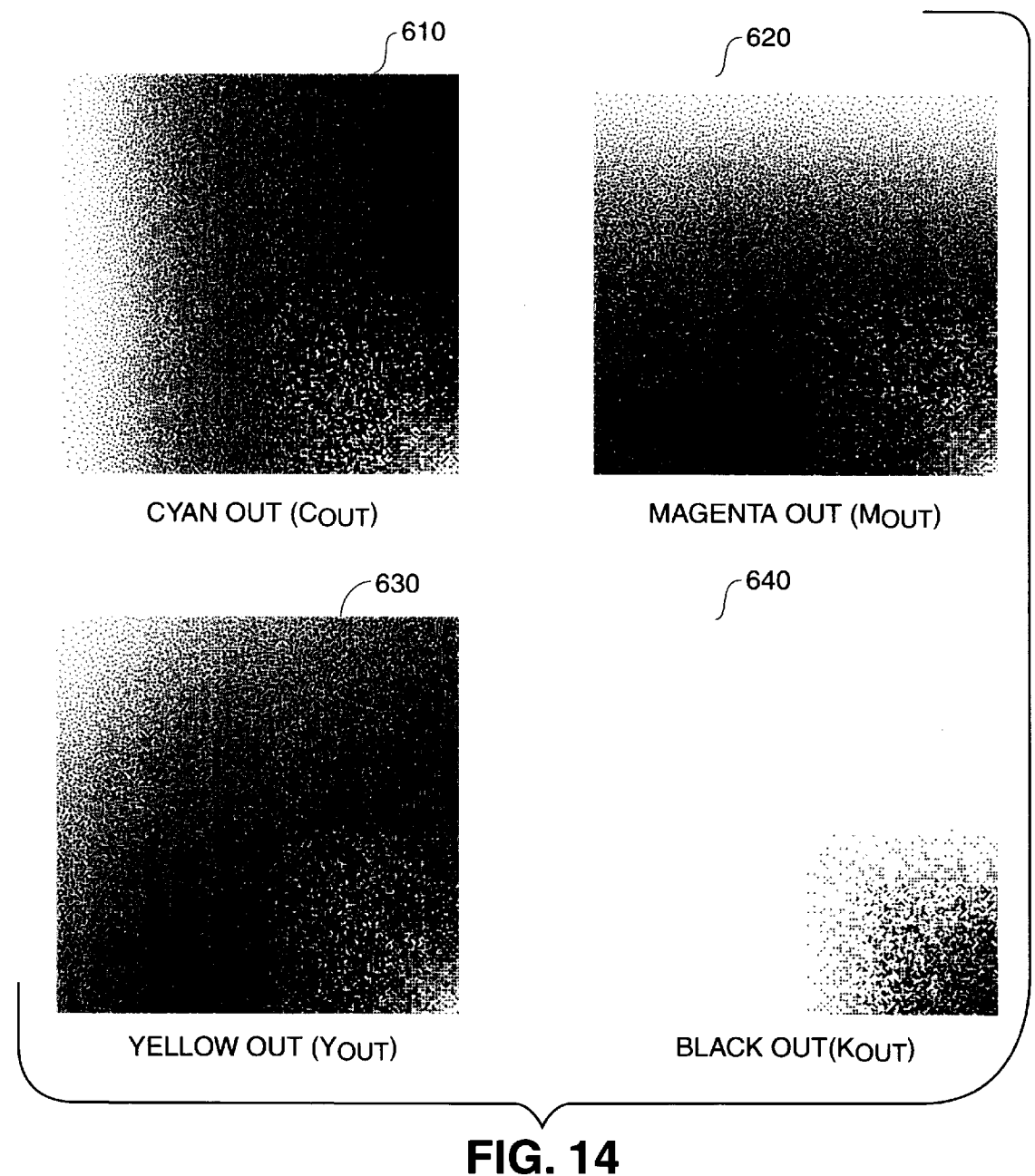
FIG. 14 shows output halftoned values for cyan, magenta, yellow and black, respectively, after application of gray component replacement according to the invention.

FIGS. 13 and 14 are used to show representative results of gray component replacement according to the invention. FIG. 13 shows intermediate halftone values for each of the cyan, magenta and yellow color components, based on the output of halftoning units 110, 120 and 130, respectively. (In the black and white reproduction capabilities of this patent application, it is not possible to show the continuous tone cyan, magenta and yellow colorants, which must be inferred from the halftone values illustrated in FIG. 13.) Intermediate cyan halftone values $C_2$ are shown at 510, intermediate magenta halftone values $M_2$ are shown at 520, and intermediate yellow halftone values $Y_2$ are shown at 530. Each of 510, 520 and 530 is a 512×512 pixel image in which the colorant is uniformly increased across the image. In the case of cyan 510, the cyan colorant is uniformly increased from left to right. In the case of magenta 520, the magenta colorant is uniformly increased from top to bottom. And, in the case of yellow 530, the yellow colorant is uniformly increased from upper left to lower right. The superposition of these three images 510, 520 and 530, is intended to illustrate all possible colorant combinations of interest in gray component replacement.

FIG. 14 shows the output of gray component replacement unit 140 when using the threshold matrix shown in FIG. 12(a) for both the subtract color matrix $M_S$ and the add black matrix $M_A$ (thereby effecting full rather than partial gray component replacement). Thus, in FIG. 14, 610 shows cyan out $C_{OUT}$, 620 shows magenta out $M_{OUT}$, 630 shows yellow out $Y_{OUT}$, and 640 shows block out $K_{OUT}$. As seen at 640, because the add black matrix $M_A$ of FIG. 12(a) does not add any black until the common gray component G is at least 50% gray, no black is added in any quadrant except the lower right hand quadrant in which the common gray component G is at least 50% gray. Likewise, because the subtract color matrix of FIG. 12(*a*) does not subtract any colorant until the common gray component G is at least 50% gray, no colorant is subtracted except in the lower right hand quadrant of each of 610, 620 and 630, in which the common gray component G is at least 50% gray. In accordance with the histogram shown in FIG. 12(*b*), it should be noted that gray component replacement is performed in a smooth and progressive manner.

While the representative example of FIGS. 13 and 14 has been performed with add and subtract threshold matrices as shown in FIG. 12(*a*), it should be understood that other matrices including the matrices shown in FIGS. 10(*a*) and 11(*a*) may also be used. In addition, as noted above, thresholds of the add matrix may differ from thresholds of the subtract matrix, in which case partial rather than full gray component replacement is performed.

It should also be recognized that gray component replacement according to the invention is applicable to any binary output device, and not merely to binary printers such as color bubble jet printers.

The invention has been described with respect to particular illustrative embodiments. It is to be understood that the invention is not limited to the above described embodiment and that various changes and modifications may be made by those of ordinary skill in the art without departing from the spirit and scope of the appended claims.

What is claimed is:

1. A gray component replacement method for each pixel of a continuous tone image, comprising the steps of:
   converting continuous tone colorant values at each pixel into intermediate halftone colorant values; and
   determining halftone output values at each pixel, including a black halftone output value, based at least in part on the intermediate halftone values and further based at least in part on a common gray component of the continuous tone colorant values.

2. A method according to claim 1, wherein said determining step determines output halftone values also based on the continuous tone colorant values.

3. A method according to claim 2, wherein said determining step determines output halftone values in at least two steps, in which one step determines whether to add black and another step determines whether to subtract color.

4. A method according to claim 3, further comprising the step of receiving continuous tone RGB values, and a second converting step of converting the continuous tone RGB values into continuous tone CMY values, and wherein said step of converting continuous tone colorant values converts the continuous tone CMY values into intermediate CMY halftone colorant values.

5. A method for converting a continuous tone color value at each pixel of an image into corresponding binary halftone values for each of three colorants plus black, comprising the steps of:
   halftone-processing the continuous tone color value at each pixel to obtain corresponding intermediate halftone values for each of the three colorants;
   calculating a common gray component from the continuous tone color value;
   a first determining step of determining whether to add a black binary halftone output based at least in part on the intermediate binary halftone values for each colorant and on the common gray component;
   a second determining step of determining whether to subtract colorant from the intermediate halftone values, based at least in part on the intermediate binary halftone values for each colorant and on the common gray component; and
   outputting binary halftone values for each of the three colorants plus black, based at least in part on whether black was added in said first determining step and on whether color was subtracted from the intermediate halftone colorant values in said second determining step.

6. A method according to claim 5, wherein in said first determining step, the common gray component is compared to a threshold obtained from an add-matrix of thresholds at a position corresponding to the position of the pixel, and wherein in said second determining step the common gray component is compared to a threshold obtained from a subtract-matrix of thresholds at a position corresponding to the position of the pixel.

7. A method according to claim 6, wherein said add matrix and said subtract matrix are identical.

8. A method according to claim 6, wherein said add matrix and said subtract matrix differ.

9. A method according to claim 5, further comprising the steps of receiving continuous tone RGB values, and of converting the continuous tone RGB values into continuous tone CMY values, and wherein said halftone-processing step converts the continuous tone CMY values into intermediate CMY halftone values.

10. A color management system for rendering an input color image into an output color image, comprising:
    plural rendering modes, each for rendering an input color image into an output color image, and each rendering an input image into an output image in accordance with a different color metric;
    selection means for selecting one of the plural rendering modes;
    wherein one of said plural rendering modes includes process steps for gray component replacement in which (1) continuous tone colorant values are converted at each pixel into intermediate halftone colorant values, and (2) halftone output values including a black halftone output value are determined at each pixel, based at least in part on the intermediate halftone values and based at least in part on a common gray component of the continuous tone colorant values.

11. A color management system according to claim 10, wherein output halftone values are determined also based on the continuous tone values.

12. A color management system according to claim 11, wherein output halftone values are determined in at least two steps, in which one step determines whether to add black and another step determines whether to subtract color.

13. A color management system according to claim 12, wherein said one rendering mode receives continuous tone RGB values and converts the continuous tone RGB values into continuous tone CMY values, and wherein the intermediate halftone colorant values are comprised by intermediate CMY halftone values converted from the continuous tone CMY values.

14. A color management system for rendering an input color image into an output color image, comprising:
    plural rendering modes, each for rendering an input color image into an output color image, and each rendering an input image into an output image in accordance with a different color metric;

selection means for selecting one of the plural rendering modes;

wherein one of said plural rendering modes includes process steps for gray component replacement in which for each pixel of the input image, (1) a continuous tone color value for the pixel is halftone-processed to obtain corresponding intermediate halftone values for each of three colorants, (2) a common gray component is calculated from the continuous tone color value, (3) it is determined whether to add a black binary halftone output based on the intermediate binary halftone values for each colorant and based on the common gray component (4) it is determined whether to subtract colorant from the intermediate halftone values, based on the intermediate binary halftone values for each colorant and based on the common gray component, and (5) binary halftone values are output for each of the three colorants plus black, based on whether black was added and based on whether color was subtracted from the intermediate halftone colorant values.

15. A color management system according to claim 14, wherein in said first determination, the common gray component is compared to a threshold obtained from an add-matrix of thresholds at a position corresponding to the position of the pixel, and wherein in said second determination the common gray component is compared to a threshold obtained from a subtract-matrix of thresholds at a position corresponding to the position of the pixel.

16. A color management system according to claim 15, wherein said add matrix and said subtract matrix are identical.

17. A color management system according to claim 15, wherein said add matrix and said subtract matrix differ, whereby partial gray component replacement is performed.

18. A color management system according to claim 14, wherein said one rendering mode receives continuous tone RGB values and converts the continuous tone RGB values into continuous tone CMY values, and wherein the intermediate halftone colorant values are comprised by intermediate CMY halftone values converted from the continuous tone CMY values.

19. Computer-executable process steps stored on a computer-readable medium, the computer executable process steps to replace the gray component for each pixel of a continuous tone image, the computer-executable process steps comprising:

an instruction sequence to convert continuous tone colorant values at each pixel into intermediate halftone colorant values; and an instruction sequence to determine halftone output values at each pixel, including a black halftone output value, based at least in part on the intermediate halftone values and further based at least in part on a common gray component of the continuous tone colorant values.

20. Computer-executable process steps according to claim 19, wherein the instruction sequence to determine determines output halftone values also based on the continuous tone colorant values.

21. Computer-executable process steps according to claim 20, wherein the instruction sequence to determine determines output halftone values in at least two steps, one of which is a step to determine whether to add black and another of which is a step to determine whether to subtract color.

22. Computer-executable process steps according to claim 21, further comprising an instruction sequence to receive continuous tone RGB values, and an instruction sequence to convert the continuous tone RGB values into continuous tone CMY values, and wherein the instruction sequence to convert converts the continuous tone CMY values into intermediate CMY halftone colorant values.

23. Computer-executable process steps stored on a computer-readable medium, the computer-executable process steps to convert a continuous tone color value at each pixel of an image into corresponding binary halftone values for each of three colorants plus black, the computer-executable process steps comprising:

an instruction sequence to halftone-process the continuous tone color value at each pixel to obtain corresponding intermediate halftone values for each of the three colorants;

an instruction sequence to calculate a common gray component from the continuous tone color values;

a first instruction sequence to determine whether to add a black binary halftone output based on the intermediate binary halftone values for each colorant and based on the common gray component;

a second instruction sequence to determine whether to subtract colorant from the intermediate halftone values based on the intermediate binary halftone values for each colorant and based on the common gray component; and an instruction sequence to output binary halftone values for each of the three colorants plus black based on whether black was added by the first instruction sequence to determine and based on whether color was subtracted from the intermediate halftone colorant values by the second instruction sequence to determine.

24. Computer-executable process steps according to claim 23, wherein in the first instruction sequence to determine, the common gray component is compared to a threshold obtained from an add-matrix of thresholds at a position corresponding to the position of the pixel, and wherein in the second instruction sequence to determine, the common gray component is compared to a threshold obtained from a subtract-matrix of thresholds at a position corresponding to the position of the pixel.

25. Computer-executable process steps according to claim 23, wherein the add matrix and the subtract matrix are identical.

26. Computer-executable process steps according to claim 23, wherein the add matrix and the subtract matrix differ.

27. Computer-executable process steps according to claim 23, further comprising an instruction sequence to receive continuous tone RGB values, and an instruction sequence to convert the continuous tone RGB values into continuous tone CMY values, and wherein the instruction sequence to halftone-process converts the continuous tone CMY values into intermediate CMY halftone values.

28. A computer-readable medium which stores computer-executable process steps, the computer-executable process steps to replace the gray component for each pixel of a continuous tone image, the computer-executable process steps comprising:

a converting step to convert continuous tone colorant values at each pixel into intermediate halftone colorant values; and a determining step to determine halftone output values at each pixel, including a black halftone output value, based at least in part on the intermediate halftone values and further based at least in part on a common gray component of the continuous tone colorant values.

29. A computer-readable medium according to claim 28, wherein the determining step determines output halftone values also based on the continuous tone colorant values.

30. A computer-readable medium according to claim 29, wherein the determining step determines output halftone values in at least two steps, in which one step determines whether to add black and another step determines whether to subtract color.

31. A computer-readable medium according to claim 30, further comprising a receiving step to receive continuous tone RGB values, and a converting step to convert the continuous tone RGB values into continuous tone CMY values, and wherein the converting step converts the continuous tone CMY values into intermediate CMY halftone colorant values.

32. A computer-readable medium which stores computer-executable process steps, the computer-executable process steps to convert a continuous tone color value at each pixel of an image into corresponding binary halftone values for each of three colorants plus black, the computer-executable process steps comprising:

a halftone-processing processing step to halftone-process the continuous tone color value at each pixel to obtain corresponding intermediate halftone values for each of the three colorants;

a calculating step to calculate a common gray component from the continuous tone color values;

a first determining step to determine whether to add a black binary halftone output based on the intermediate binary halftone values for each colorant and based on the common gray component;

a second determining step to determine whether to subtract colorant from the intermediate halftone values, based on the intermediate binary halftone values for each colorant and based on the common gray component; and an outputting step to output binary halftone values for each of the three colorants plus black, based on whether black was added in the first determining step and based on whether color was subtracted from the intermediate halftone colorant values in the second determining step.

33. A computer-readable medium according to claim 32, wherein in the first determining step the common gray component is compared to a threshold obtained from an add-matrix of thresholds at a position corresponding to the position of the pixel, and wherein in the second determining step the common gray component is compared to a threshold obtained from a subtract-matrix of thresholds at a position corresponding to the position of the pixel.

34. A computer-readable medium according to claim 32, wherein the add matrix and the subtract matrix are identical.

35. A computer-readable medium according to claim 32, wherein the add matrix and the subtract matrix differ.

36. A computer-readable medium according to claim 32, further comprising a receiving step to receive continuous tone RGB values, and a converting step to convert the continuous tone RGB values into continuous tone CMY values, and wherein the halftone-processing step converts the continuous tone CMY values into intermediate CMY halftone values.

* * * * *